United States Patent

[11] 3,604,208

| [72] | Inventor | William C. Borunda<br>1606 Delvale St., West Covina, Calif. 91790 |
|---|---|---|
| [21] | Appl. No. | 27,300 |
| [22] | Filed | Apr. 10, 1970 |
| [45] | Patented | Sept. 14, 1971 |

[54] EDGER ATTACHMENT FOR LAWN MOWERS
8 Claims, 3 Drawing Figs.

[52] U.S. Cl. .................................................. 56/11.5,
56/13.7
[51] Int. Cl. ........................................................ A01d 35/26,
A01d 53/14
[50] Field of Search ............................................ 56/11.6,
11.5, 14.7, 13, 7, 16.7, 16.9, 17.1, 17.2, 17.3, 17.4,
17.5, 17.6, 255, 256; 172/13–18

[56] References Cited
UNITED STATES PATENTS

| 2,707,858 | 5/1955 | Norton et al. | 56/11.5 |
| 3,012,390 | 12/1961 | Caskin | 56/17.6 |
| 3,053,035 | 9/1962 | Earley | 56/256 |
| 3,125,165 | 3/1964 | Boudreaux et al. | 172/14 |
| 3,319,406 | 5/1967 | Miles | 56/13.7 |

Primary Examiner—Russell R. Kinsey
Attorney—J. Carroll Baisch

ABSTRACT: This disclosure relates to lawn care apparatus, and more particularly to a combination mower/edger. Both units are driven by a single motor and can be operated either singly or in combination. The edger portion is simplified by being driven by a flexible shaft and is adapted to be positioned on either side of the mower, depending upon the convenience of the operator. Moreover, the edger may be tilted relative to the mower for a desired angle of edging, or to compensate for the slope of the ground.

PATENTED SEP 14 1971  3,604,208

INVENTOR.
William C. Borunda
BY
Attorney

EDGER ATTACHMENT FOR LAWN MOWERS

BACKGROUND

The art of lawn care depends, to a great extent, upon two particular pieces of equipment—namely, a lawnmower and a lawn edger. As is known to those in the art, the mower is used to trim the lawn to a desired height, and the edger is used to trim the edge of the lawn to produce a neat appearance. Generally, in the past, the lawnmower and the lawn edger have been separate pieces of equipment—each ordinarily self-powered, thus raising the cost of lawn care. On the other hand, there have been numerous proposals to use edger attachments that fasten to the mower; but the variety of mowers have made these edger attachments complex and unfeasible.

OBJECTS AND DRAWINGS

It is, therefore, the principal object of my invention to provide improved lawn care apparatus.

It is another object of my invention to provide a composite mower/edger combination that uses a single source of power.

It is a further object of my invention to provide a mower/edger combination that is capable of edging either edge of the lawn at the convenience of the operator.

It is a still further object of my invention to provide a combination mower/edger that is low in cost, easy to use, and minimal in upkeep.

Figure 1:
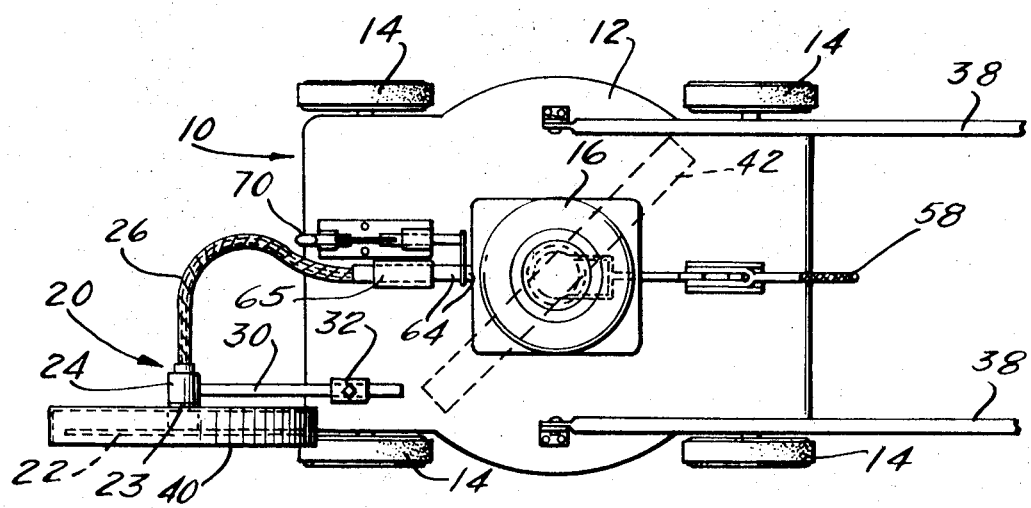
Figure 2:
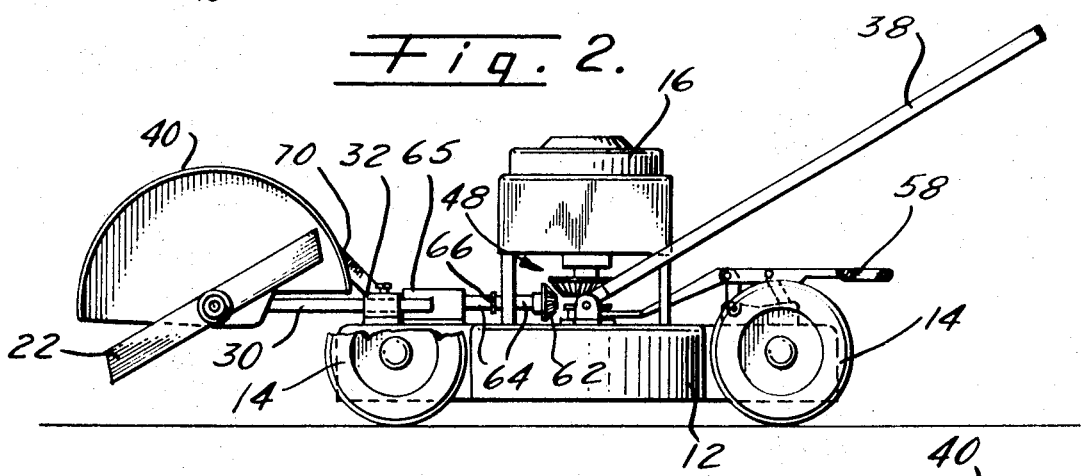
Figure 3:
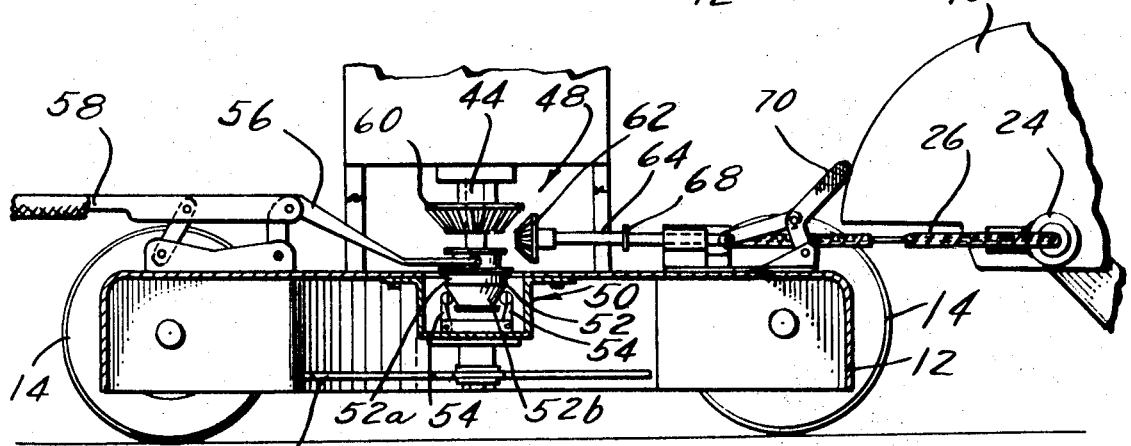

The attainment of these objects, and others, will be realized from a study of the following description, taken in conjunction with the drawings, of which FIG. 1 is a top view of the mower/edger combination;

FIG. 2 is a side view with positions broken away of the mower/edger combination; and FIG. 3 is an enlarged longitudinal-sectional view of the assembled apparatus shown in FIGS. 1 and 2.

DESCRIPTION

FIG. 1 shows a plan view of the mower/edger combination 10 which comprises a framework or housing 12 mounted on wheels 14 in the well-known manner. A motor 16 of any desired type is mounted on framework 12 for operating the mower portion and/or the edger portion in a manner to be described later.

FIG. 1 shows edger portion 20 to comprise a rotary edger blade 22 fastened by suitable nuts, washers, etc., to a rotatable shaft 23 positioned in a bearing housing 24. The rotatable shaft 23 is connected to one end of a flexible shaft (not visible in FIG. 1) encased in a flexible conduit 26, the other end of the flexible shaft being operatively connected to motor 16. In this way, the edger blade may be rotated by the motor.

FIG. 1 also shows that the bearing housing 24 is mounted on, or is integral with, a mounting arm 30 that is attached to the framework 12 by means of a body clamp 32. The combination of the mounting arm 30 and the body clamp 32 is such that the edger blade arm may be pivoted upwardly or downwardly along with the framework 12 so that the edger blade 22 may be raised from or lowered relative to the lawn that is to be edged. Also, the combination of arm 30 and body clamp 32 is such that the edger blade may be pivoted from side to side, so that the edger blade may be perpendicular to the ground for normal use, or angled to the ground for special effects or if the ground happens to be sloped at that point.

FIG. 1 also indicates that a second body clamp could be positioned at the other side of framework 12, such a two clamp arrangement would permit the edger portion to be easily switched to the side of the equipment that is most convenient for the operator. This switching flexibility is available because of the use of the flexible shaft and flexible conduit for driving the edger blade. Moreover, it will be noted that the edger is positioned in the front portion of the equipment for best visibility; although, it may be positioned in the rear portion if so desired.

Referring now to FIG. 2, this shows a side view of the apparatus, indicating, in addition, a handle 38 for maneuvering the equipment. A guard 40 for the edger blade is also shown. In this drawing, the mower position is indicated to be of the rotary type, having a rotary disc mower blade 42 journaled to the framework by conventional means. Alternatively, of course, other types of mowers may be used.

FIG. 2 also indicates that motor 16 has a power takeoff shaft 44; that the edger portion gets its power from the power takeoff shaft by means of a gear arrangement 48; and that the mower portion gets its power from the power takeoff shaft by means of a clutch arrangement 50. These power-transmitting mechanisms will be discussed later.

In the above way, a single motor may be used to drive the mower portion and/or the edger portion, regardless of which side of the equipment the edger portion happens to be positioned on at that particular moment.

Attention is now directed to FIG. 3, which is a longitudinal-sectional view of the apparatus. Whereas previously the coupling between the motor and the mower portion had been shown as a plate clutch (which may alternatively be a cone clutch), FIG. 3 indicates this coupling as a driving rod 52 that has a top 52a that is cylindrical with a frustoconical depending part 52b with the lower end smaller than the upper end, the driving rod being adapted to engage driving fingers 54 that are connected to the rotary mower blade 42. Actual coupling of the driving rod and driving fingers is shown to be accomplished by lowering the driving rod along longitudinal splines by means such as a yoke 56 under the control of an energizing lever 58. In this arrangement, the lever 58 thus controls the operation of the mower portion; although, other linkages may be used.

FIG. 3 also shows how the edger portion may be driven. In this illustration, the motor power takeoff shaft 44 has a primary gear 60 attached thereto; and a secondary gear 62 is shown to be engageable with the primary gear. It will be noted that secondary gear 62 has a shaft 64 that is positioned in a bearing housing 65. Thus, rotary power may be transmitted from the motor to secondary gear 62, and to its shaft 64.

As indicated previously, secondary gear 64 is attached to one end of a flexible shaft encased in flexible tubing 26, so that rotation of the secondary gear drives edger blade 22.

In order to provide selective coupling of the edger portion, gear shaft 64 has a peripheral groove 66 therein; and a yoke 68, which may be a notched plate, slides the secondary gear shaft 64 longitudinally in bearing housing 65, in response to movement of energizing lever 70. Thus, lever 70 moves the secondary gear 62 into and out of engagement with primary gear 60 to control the operation of edger portion 20.

In order to take full advantage of the flexible shaft/flexible tubing arrangement, I have found it desirable to use an economical method of anchoring the flexible shaft to the gear shaft. I have accomplished this by hollowing out the end of the gear shaft, inserting the end of the flexible shaft into the hollowed-out portion, and then pouring molten lead into the hollowed-out portion. When the lead hardens, it produces an anchorage between the end of the flexible shaft and the gear shaft.

CONCLUSIONS

The disclosed mower/edger combination has innumerable advantages over prior art device. Firstly, it uses only a single motor, making it cheaper and easier to manufacture. Secondly, it permits the use of the power portion and/or the edger portion, either individually or in combination. Thirdly, it permits the edger to be mounted on either side of the apparatus, depending upon the judgment of the operator. Fourthly, the edger may perpendicular or angled to the ground, depending upon the desires of the operator or the slope of the ground. Finally, the overall device is a relatively new modification of presently made units and can easily be incorporated therein with a minimum of redesign.

Also, if desired, a longer flexible shaft may be substituted and some other accessory or tool attached to the free end and driven by the motor 16, the mower blade 42 then being uncoupled or operably disengaged from the motor 16, as above described.

It is also to be understood that the edger may also be used in combination with a reel type of mower.

I claim:
1. A mower/edger comprising in combination:
   A. a framework;
   B. a motor on said framework, said motor having a power takeoff shaft;
   C. mower means, mounted on said framework, for mowing a lawn;
   D. first driving means for driving said mower means;
   E. first coupling means, interconnecting said first driving means and said power takeoff shaft, for selectively coupling/decoupling said mower means and said motor;
   F. edger means, mounted on said framework, for edging said lawn;
   G. second driving means for driving said edger means;
   H. second coupling means, interconnecting said second driving means and said power takeoff shaft, for selectively coupling/decoupling said edger means and said motor; and
   I. energizing means for energizing said coupling means, for causing said mower means and said edger means to operative singly or together.

2. The combination of claim 1 wherein said second driving means comprises a flexible shaft.

3. The combination of claim 2 wherein said edger means mounting comprises a body clamp on said framework.

4. The combination of claim 2 wherein said edger means mounting comprises at least one body clamp adapted to be disposed on either side of said framework, whereby said flexible shaft permits said edger means to be shifted to either side of said framework.

5. The combination of claim 3 wherein said first coupling means comprises a disengageable clutch arrangement, and said second coupling means comprises a disengageable gear arrangement.

6. The combination of claim 5 wherein said energizing means comprises lever means for sliding said gear arrangement into and out of engagement.

7. A mower/edger comprising in combination:
   A. a framework;
   B. a motor mounted on said framework, said motor having a power takeoff shaft;
   C. mower means, comprising a mower blade rotatably mounted on said framework, for mowing a lawn;
   D. first driving means for driving said mower means;
   E. first coupling means, comprising disengageable clutch arrangement interconnecting said first driving means and said power takeoff shaft, for selectively coupling/decoupling said mower means and said motor;
   F. edger means, comprising an edger blade rotatably mounted on said framework, for edging said lawn;
   G. said edger means/mounting means comprising at least one body clamp adapted to be disposed on either side of said framework for permitting said edger means to be shifted to either side of said framework,
   H. second driving means, comprising a flexible shaft encased in a flexible tubing, for driving said edger means;
   I. second coupling means, comprising a disengageable gear arrangement interconnecting said second driving means and said power takeoff shaft, for selectively coupling/decoupling said edger means and said motor;
   J. first energizing lever means for energizing said first coupling means;
   K. second energizing lever means for energizing said second coupling means, whereby said mower means and said edger means may be made operative singly or together.

8. A mower/edger comprising in combination:
   A. a framework;
   B. a motor mounted on said framework, said motor having a power takeoff shaft;
   C. mower means, mounted on said framework, for mowing a lawn;
   D. first driving means for driving said mower means;
   E. first coupling means, interconnecting said first driving means and said power takeoff shaft, for selectively coupling/decoupling said mower means and said motor;
   F. an accessory tool;
   G. second driving means for driving said accessory tool;
   H. and second coupling means, interconnecting said second driving means and said power takeoff shaft, for selectively coupling/decoupling said accessory tool and said motor.